United States Patent
Romero et al.

(10) Patent No.: US 7,249,179 B1
(45) Date of Patent: Jul. 24, 2007

(54) SYSTEM FOR AUTOMATICALLY ACTIVATING RESERVE HARDWARE COMPONENT BASED ON HIERARCHICAL RESOURCE DEPLOYMENT SCHEME OR RATE OF RESOURCE CONSUMPTION

(75) Inventors: Francisco J. Romero, Plano, TX (US); Thomas E. Turicchi, Jr., Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1206 days.

(21) Appl. No.: 09/709,705

(22) Filed: Nov. 9, 2000

(51) Int. Cl.
*G06F 15/173* (2006.01)
(52) U.S. Cl. .................. 709/226; 709/223; 709/221
(58) Field of Classification Search ........ 709/220–226; 718/105, 104; 705/8; 702/186
See application file for complete search history.

(56) References Cited

U.S. PATENT DOCUMENTS

| | | | | |
|---|---|---|---|---|
| 5,475,844 A | * | 12/1995 | Shiramizu et al. | 718/104 |
| 5,826,239 A | * | 10/1998 | Du et al. | 705/8 |
| 6,006,248 A | * | 12/1999 | Nagae | 718/105 |
| 6,460,082 B1 | * | 10/2002 | Lumelsky et al. | 709/226 |
| 6,463,454 B1 | * | 10/2002 | Lumelsky et al. | 718/105 |
| 6,466,980 B1 | * | 10/2002 | Lumelsky et al. | 709/226 |
| 6,516,350 B1 | * | 2/2003 | Lumelsky et al. | 709/226 |
| 6,560,647 B1 | * | 5/2003 | Hafez et al. | 709/224 |
| 6,658,449 B1 | * | 12/2003 | Brenner et al. | 718/105 |
| 6,691,067 B1 | * | 2/2004 | Ding et al. | 702/186 |

* cited by examiner

*Primary Examiner*—Le Hien Luu

(57) ABSTRACT

An apparatus and method to automatically activate a reserve resource when the load on a number of active resources (e.g., a number of CPUs or servers) meets a threshold. A resource usage policy specifying at least one threshold and having a corresponding task is compared to a monitored load on the active resource. When the monitored load meets the threshold as specified in the resource usage policy, the corresponding task is performed. For instance, the corresponding task can be to signal an event manager (e.g., a pager), to activate a reserve resource, etc. Once a reserve resource is activated, the load is balanced among the number of active resources and the activated reserve resource. When the load drops below the threshold, the processor can deactivate the reserve resource. In a preferred embodiment, the processor updates a configuration profile for tracking each of the resources. Another embodiment includes charging a fee for monitoring and activation.

26 Claims, 5 Drawing Sheets

US 7,249,179 B1

SYSTEM FOR AUTOMATICALLY ACTIVATING RESERVE HARDWARE COMPONENT BASED ON HIERARCHICAL RESOURCE DEPLOYMENT SCHEME OR RATE OF RESOURCE CONSUMPTION

FIELD OF THE INVENTION

The invention pertains to an apparatus and method to monitor a load on a number of active resources and to automatically activate a reserve resource when the load on the number of active resources meets a threshold specified in a resource usage policy.

BACKGROUND OF THE INVENTION

Computing and network resources are subject to wide fluctuations in demand. For example, a computing system or a component thereof (e.g., a CPU or memory) can experience fluctuations from little to no load in the early morning hours or on weekends, to very high loads during late afternoon, weekday usage, or during the evening hours when many computing systems are programmed to perform high volume calculations and other data processing. Likewise, user demand on Internet or other network resources (e.g., a server or host computer) depend on a variety of factors such as the number of users or the time of day. In addition, traffic to a particular Internet site can start out slow and due to advertising, linking, etc., grow exponentially in a short period of time. The timing of such increases in demand are often difficult to predict, making it difficult to anticipate or plan for the computing and/or network resource capacity which is necessary to meet the demand at any given time.

One solution is to provide more resource capacity (e.g., more CPUs, more servers, etc.) than is estimated to be necessary for normal conditions. However, such over-allocation of resources can be costly and unnecessary. In addition, many small or start-up companies may not be able to afford extra resources until, for example, sales volume increases. Therefore, another solution is to provide both active resources and reserve resources, where the active resources are sufficient for typical demand and the reserve resources are only activated when there is a peak in demand (i.e., "capacity-on-demand"). However, current approaches to capacity-on-demand require manual intervention to activate an additional resource. That is, before the active resources reach capacity, the user must contact the vendor and obtain a code to "unlock" and activate the additional resource. Therefore, an administrator must be "on-call" at all times during operation (i.e., twenty-four hours every day, seven days a week) to monitor the active resources and activate reserve resources as necessary. In addition, sudden spikes in demand that require immediate deployment of an additional resource can cause interruptions in service before the additional resource can be activated.

It is therefore a primary object of this invention to provide the resource capacity that is necessary to meet fluctuations in user demand dynamically or automatically. Another object of the invention is to automatically activate a reserve resource when additional resource capacity is required to meet demand.

SUMMARY OF THE INVENTION

In the achievement of the foregoing objects, the inventors have devised an apparatus and method to monitor the load on a number of active resources and to automatically activate a reserve resource when the load on the active resources meets a threshold that is specified in a resource usage policy.

The invention can be embodied in software or firmware (i.e., program code), stored in a computer readable storage media (e.g., a disk, a RAM, or other memory). The software can be executed, for example, by a computer processor linked directly, over a network, through a peripheral device, etc. to an active resource (or pool of active resources) and a reserve resource (or pool of reserve resources). A resource usage policy is stored in the storage media or memory and includes at least one threshold for triggering at least one task. For example, the threshold of 90% and the task of activating a resource can be specified in a resource usage policy as "If Active Resource No. 1 usage exceeds 90% for more than ten seconds Then Activate Reserve Resource No. 1." Tasks might also comprise transmitting a pager alert, generating an alarm, and so on. A computer readable program code is also stored in the memory and is accessed by the processor for performing a number of functions. These functions include monitoring the load on a number of active resources such as a CPU or a server and comparing the monitored load (e.g., as a function of percent utilization and/or duration of usage) to the threshold specified in the resource usage policy. When the resource usage policy dictates, corresponding task is performed.

As an example, when the load meets the threshold specified in the resource usage policy, the processor can send an alarm to the administrator's pager to warn the administrator that the active resource has reached the threshold, or the processor can automatically activate a reserve resource. Preferably, a hierarchy of monitoring policies (i.e., specified thresholds and corresponding tasks) are used for different levels of resource allocation. For example, at a specified threshold of "90% usage for ten seconds," the corresponding task is a "pager alert," and at a specified threshold of "95% usage for five seconds," the corresponding task is to "activate an additional CPU," and at a specified threshold of "95% usage of one or more system components for ten seconds," the corresponding task is to "activate an entire system." Alternatively, the administrator and/or the processor can dynamically set thresholds and/or tasks based on any suitable factors such as the rate of resource consumption, the number of remaining reserve resources, etc. For example, when the monitored rate of resource consumption is "an additional 1% active resource consumption per hour," the processor and/or administrator can set the next task to "generate a pager alert," whereas when the rate of resource consumption is "an additional 1% active resource consumption per minute," the processor can set the next task to "automatic activation of a reserve resource."

Once a reserve resource is activated, the program code generates an indication that the reserve resource is activated. The indication can trigger a pager or email alert sent to an administrator, a signal sent to a load balancer or other peripheral device, updating a configuration profile, etc. Preferably, the program code also causes the processor or a peripheral device such as a load balancer to balance the load among the active resource and the activated reserve resource. In one embodiment, the processor or peripheral device also transfers at least part of the load from the number of active resources to the activated reserve resource, thereby reducing the load on the active resources. Preferably, the processor or a peripheral device also maintains a configuration profile for each active resource, each activated resource, and each reserve resource. The configuration profile can be used to optimally allocate the available resources, and to alert a system administrator before the system reaches an over-committed state (i.e., where there are insufficient reserve resources to handle the demand). In addition, once the load meets a specified threshold (i.e., the activation threshold or an altogether separate threshold), the processor preferably deactivates the reserve resource, thereby reducing operation costs and returning the reserve resource to the reserve resource pool. The resource is then once again available for future allocation. Another embodiment of the invention includes charging a fee for monitoring and activation.

As such, the apparatus and method of the present invention provide resource capacity-on-demand to meet fluctuations in user demand without unnecessary and costly over-allocation of resources. In addition, the reserve resource is automatically activated so that manual intervention is not required, thereby reducing or eliminating service interruptions and the need for an administrator to be on-call during operation. However, the present invention also preferably alerts an administrator to give him or her the opportunity for manual intervention and/or monitoring when desired. The load continues to be monitored after activating the reserve resource so that the activated reserve resource can be deactivated when it is no longer needed, or so additional reserve resources can be activated if necessary. Thus, the reserve resource is automatically returned to the reserve resource pool, thereby reducing costs (i.e., the user need only pay for the time that the resource is allocated) and/or making the reserve resource available to other systems for efficient and optimum resource allocation. In addition, the invention also includes a new utility model for doing business in which the purchaser pays for service up front, but does not pay for the hardware until it is actually needed.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings in which.

DESCRIPTION OF THE PREFERRED EMBODIMENT

Figure 1:
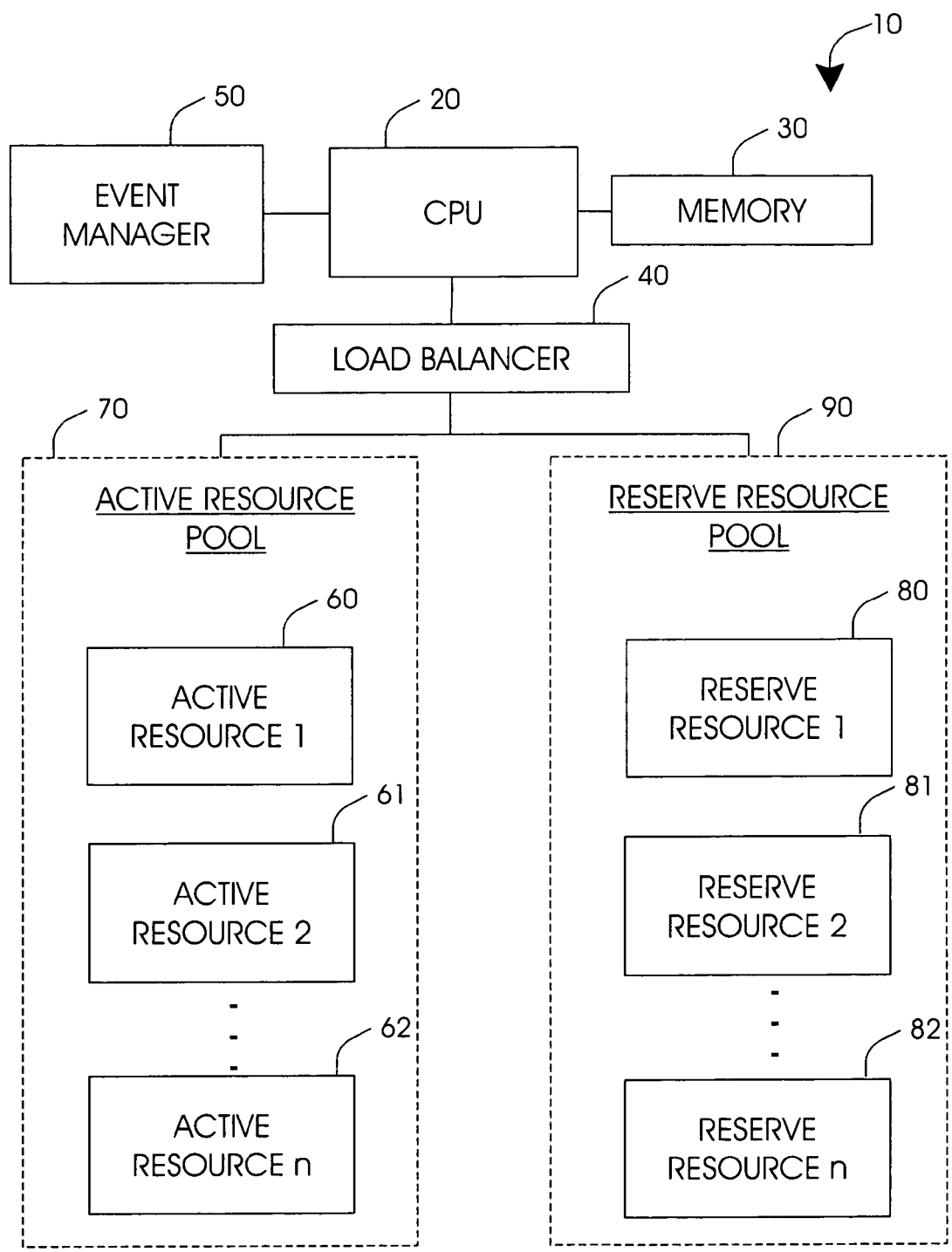
FIG. 1 is a block diagram of the components of the monitoring and activation apparatus.

FIG. 1 shows various hardware components which can be used by the monitoring and activation apparatus 10 of the present invention. The apparatus 10 includes a processor or CPU (central processing unit) 20 and a computer readable storage device or memory 30. Optionally, the processor 20 can be linked over a conventional communication or other network link directly to a pager, phone, computer or the like, or indirectly to the above via an event manager 50. The processor 20 is also linked through an optional peripheral device 40 such as a load balancer to an active resource 60 (e.g., a CPU or a server) or an active resource pool 70 having a plurality of active resources 60, 61, 62 therein. The processor 20 is also linked through the same or another optional peripheral device 40 to a reserve resource 80 or a reserve resource pool 90 having a plurality of reserve resources 80, 81, 82 therein. Computer readable program code is provided (e.g., stored in memory 30 and accessed by the processor 20) for monitoring the load on the active resource 60 (or pool 70) and comparing the monitored load to a threshold 315 (FIG. 3) specified in a resource usage policy 310 (FIG. 3) that can be stored in memory 30. When the monitored load meets the specified threshold 315, the program code dictates performance (e.g., by processor 20, peripheral device 40, etc.) of a task 320 (FIG. 3) corresponding to the specified threshold 315. For example, the corresponding task 320 can be to signal the event manager 50 or to activate a reserve resource 80 from the reserve resource pool 90. Once a reserve resource 80 is activated, the program code preferably dictates generating an indication that the reserve resource 80 is activated. The indication can be an alert sent via an Internet HTML (hypertext mark-up language) page, a pager, email, etc. to the administrator. The indication can also be a signal sent to a peripheral device 40, or a combination alert and signal. Preferably, the program code also dictates that the processor 20 (or a peripheral device 40) balance the load among the active resource 60 (or pool 70) and the activated reserve resource 80. When the load drops below the specified threshold 315 (or meets a separately specified threshold 315), the program code also preferably dictates that the reserve resource 80 be deactivated and returned to the reserve resource pool 90. Also in a preferred embodiment, a configuration profile (e.g., a database in memory 30 containing each resource and the status thereof) is updated (or even maintained) for tracking the status of the active resource 60 and the reserve resource 80 (and optionally pools 70, 90).

It is understood that the processor 20 can be any conventional processor such as an Intel PENTIUM® processor, a personal computer system (PC) such as a desktop or laptop computer, or can be an ASIC (application specific integrated circuit) which is specifically manufactured for use with the present invention. Likewise, the computer readable storage medium or memory 30 can be any suitable memory such as RAM, ROM, magnetic tape, compact disc, a combination thereof, etc. The processor 20 and the memory 30 need not be separate units and can be combined, or alternatively, the processor 20 and the memory 30 can be separately housed and linked to one another over a remote network or other suitable connection. Likewise, there can be a number of (i.e., one or more) processors 20 and/or a number of (i.e., one or more) memories 30 that are connected or linked via the Internet, Intranet, LAN, WAN, etc. In such a scenario, the storage of the aforementioned program code may be distributed over said memories, or executed by various of the processors.

The event manager 50 monitors system resources, configures monitoring requests, checks resource status, and sends notification when configured conditions are met. An example of an event manager 50 is described in the "Event Monitoring Service User's Guide," HP Part Number B7612-90015, November 1999, Copyright 1999 Hewlett-Packard Company). It is also understood that the event manager 50 can pass an event notification to any suitable device to notify the administrator that the specified threshold 315 (FIG. 3) has been met. In addition, the event manager 50 can pass an event notification to notify a vendor that the specified threshold 315 (e.g., a CPU has been activated) has been met so that the vendor can monitor customer compliance with billing policies, charge the user a fee when a reserve resource 80 is activated, etc. For instance, the event manager 50 can pass an event notification to a conventional pager, a cellular or other handheld phone, an Internet appliance, a desktop or laptop computer, a conventional display, signal light, audio speaker, an Internet HTML page, an e-mail address, a combination thereof, etc. Similarly, the event manager 50 can be hardwired to the processor 20 or can be accessed by the processor 20 via a remote connection (e.g., via the Internet, a telecommunications network, a modem connection, a T-1 or DSL connection, satellite, etc.). It is to be expressly understood that these examples are merely illustrative and are not intended to limit the scope of the invention.

Figure 2:
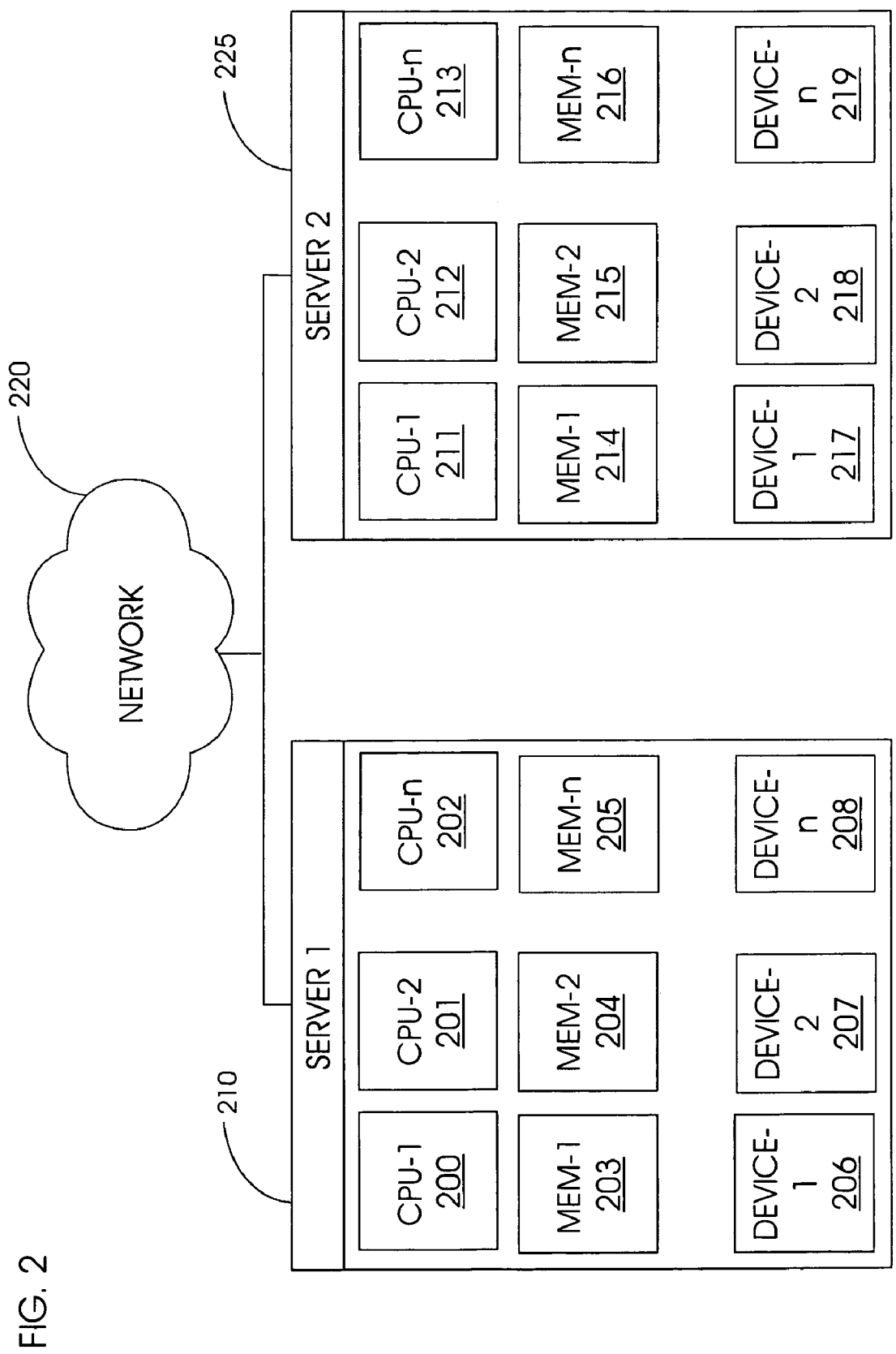
FIG. 2 illustrates a pool of resources for use with the monitoring and activation apparatus.
Figure 3:
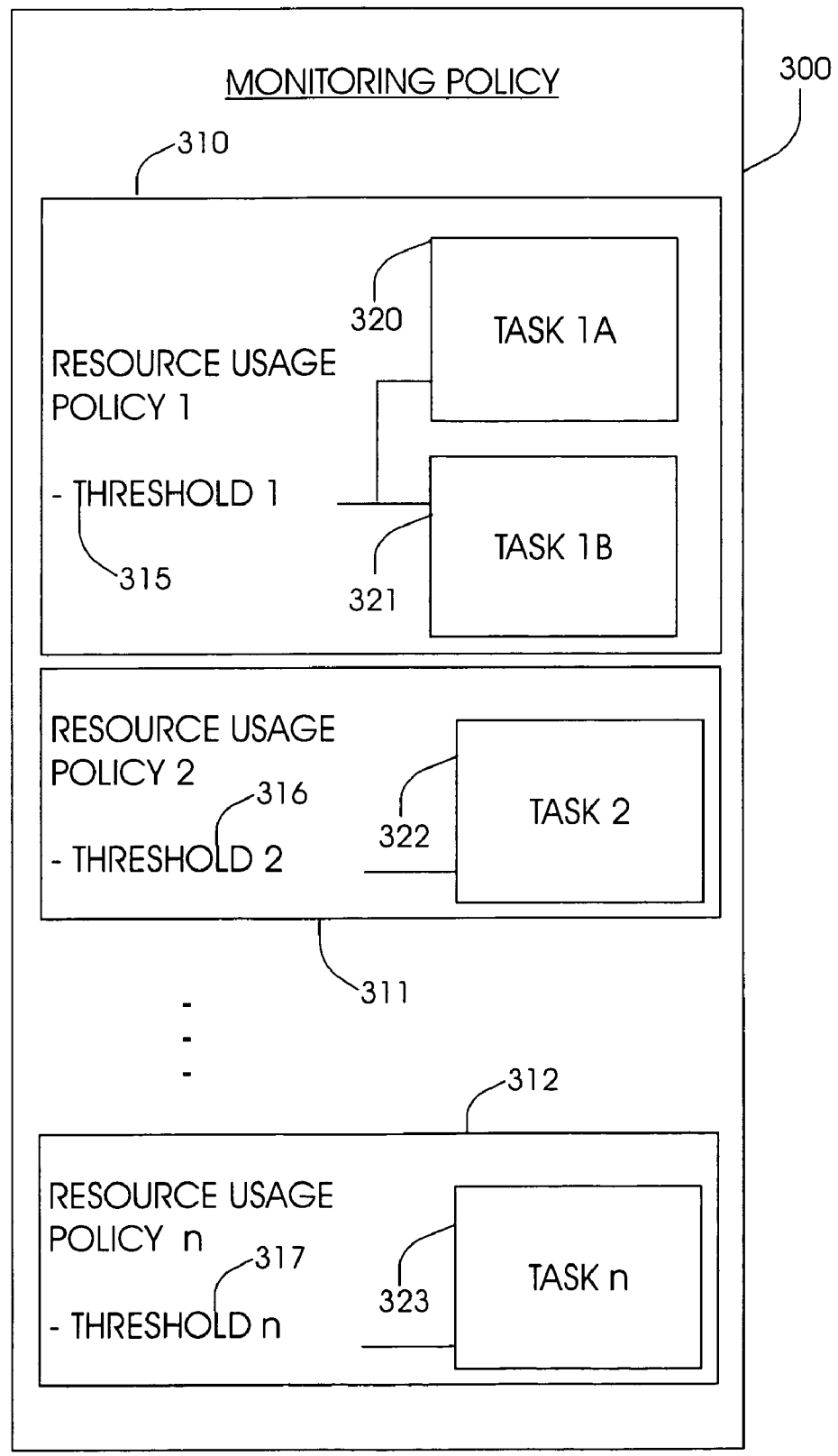
FIG. 3 illustrates monitoring policies for use with the apparatus and method of the present invention.

FIG. 2 is illustrative of various types of resources 60, 80 which may be active or on reserve in the system of FIG. 3. An active resource 60 or reserve resource 80 can be an individual component 200-208 and 211-219 such as a CPU, a memory, a peripheral device, etc., and/or can be an entire system 210, 225 such as a host computer or PC, a server, etc. Likewise, the active resource 60 and the reserve resource 80 can be a combination thereof, such as a CPU, a memory, and a PC system. A number of (i.e., one or more) resources 60, 80 can be monitored as dictated by the program code and executed on a processor 20 directly connected to the resources 60, 80, or connected to the resources 60, 80 over a conventional network 220.

It is understood that the arrangements shown in FIG. 1 and FIG. 2 are merely illustrative and not intended to limit the teachings of the present invention. For example, the resources 60, 80 and processor 20 (and related memory 30, peripheral devices 40, and event managers 50) need not be clustered. That is, the resource pools 70, 90 can include resources 60, 80 that are dispersed, for example, over the network 220. Likewise, the processor 20 and/or peripheral device 40 can control (e.g., monitor, activate, deactivate) the resources 60, 80 in more than one resource pool 70, 90.

FIG. 3 illustrates monitoring policy (e.g., stored in memory 30). The monitoring policy 300 includes at least one resource usage policy 310 specifying a threshold 315 therein and having a task 320 corresponding thereto. However, it is understood that the monitoring policy can include any number of resource usage policies 310-312 (Policy 1, Policy 2, . . . Policy n), each specifying one or more thresholds 315-317 therein and can have any number of corresponding tasks 320-323 (Task 1A, Task 1B, Task 2, . . . Task n) assigned or corresponding thereto. In addition, more than one resource usage policy 310 can trigger the same task 320 (not shown), and more than one task 320 can be triggered by a single resource usage policy 310 (e.g., Task 1A and 1B both correspond to Threshold 1 in FIG. 3).

Preferably, the monitoring policy includes a hierarchy of resource usage policies 310 with thresholds 315 and tasks 320. That is, a low threshold can be set to recognize the early signs of high demand on the active resource 60, and the processor 20 can alert the administrator of these early signs of high demand. Thus, the administrator can manually intervene at an early stage (i.e., before additional resources are activated and a fee charged for their use). For example, the administrator can check whether the high demand is due to increased user traffic or a failure in a software routine (e.g., an endless loop) that has caused a resource to be over-utilized. In the example where there is a failure, the administrator can manually intervene to reset the application causing over-utilization. Or in another example where the administrator decides to allocate low cost resources instead of the higher cost resources designated by the task 320 corresponding to the next specified threshold, the administrator can manually allocate these alternative resources. A higher threshold can also be set, so that where the resource utilization continues to increase after the alert has been sent to the administrator, the program code can dictate activating the reserve resource 80, and, if desired, also transmit a message to the administrator notifying the administrator that the reserve resource 80 has been activated. As such, the administrator can check if the reserve resource 80 was activated in error or as part of a test and deactivate the reserve resource if necessary (e.g., before incurring a charge). Another still higher threshold can be specified to activate an entire system as the load continues to increase. Yet a higher threshold can be specified accounting for the combination of active and activated reserve resources 60,80 when there are no additional resources (i.e., the system is entering an over-committed state). When this yet higher threshold is met, the program code can dictate transmitting a high priority alert to the administrator notifying the administrator that the load is continuing to increase and that absent manual intervention such as closing applications, the resources may fail. An example of such a hierarchy is shown in the following table.

TABLE I

| Threshold | Task |
| --- | --- |
| 1) Average CPU usage > 90% for 10 seconds | 1) Transmit Alarm "High CPU Usage" |
| 2) Average CPU usage > 95% for 5 seconds | 2) Activate Reserve Resource AND Transmit Alarm "High CPU Usage - Reserves Activated" AND Balance Load |
| 3) Average Combined CPU usage > 80% for 10 seconds | 3) Activate Reserve Resource (Entire System) |
| 4) Average Combined CPU usage > 80% for 10 seconds AND Additional Reserve Resources Unavailable | 4) Transmit Alarm "High CPU Usage - No More Reserves To Activate - Manual Intervention Required" |

It is to be expressly understood that the threshold 315 can be 1) set (i.e., specified in the resource usage policy 310) prior to monitoring, 2) set or changed during monitoring, or 3) set based on a combination thereof. That is, the threshold can be specified in the resource usage policy 310 prior to the load reaching the threshold. However, the program code can dictate, and/or the administrator can manually specify, a threshold 315 during monitoring. That is, a threshold 315 can be specified and/or assigned a corresponding task based on various factors such as the rate of resource consumption, the number of remaining reserve resources, or any other suitable algorithm.

As an example, when the rate of resource consumption is "an additional 1% active resource consumption per hour," the task "generate a pager alert" can be assigned to the next specified threshold 315, whereas when the rate of resource consumption is "an additional 1% active resource consumption per thirty seconds," the task "automatic activation of a reserve resource" can be assigned to the next specified threshold 315. In another example, the program code can dictate that a status be transmitted to the administrator upon reaching a first specified threshold 315, and the administrator can then specify a second threshold 315 and corresponding task 320 based on the status and/or other considerations. In yet another example, the administrator can transmit one or more resource usage policies 310 before or during monitoring via keyboard input, e-mail, FTP (file transfer protocol), voice commands, etc. Indeed, entire monitoring policy can be transmitted by the administrator at any time prior to or during the monitoring. Likewise, resource usage policies 310, including thresholds 315 and tasks 320, can be established in the monitoring policy 300 as defaults.

Figure 4:
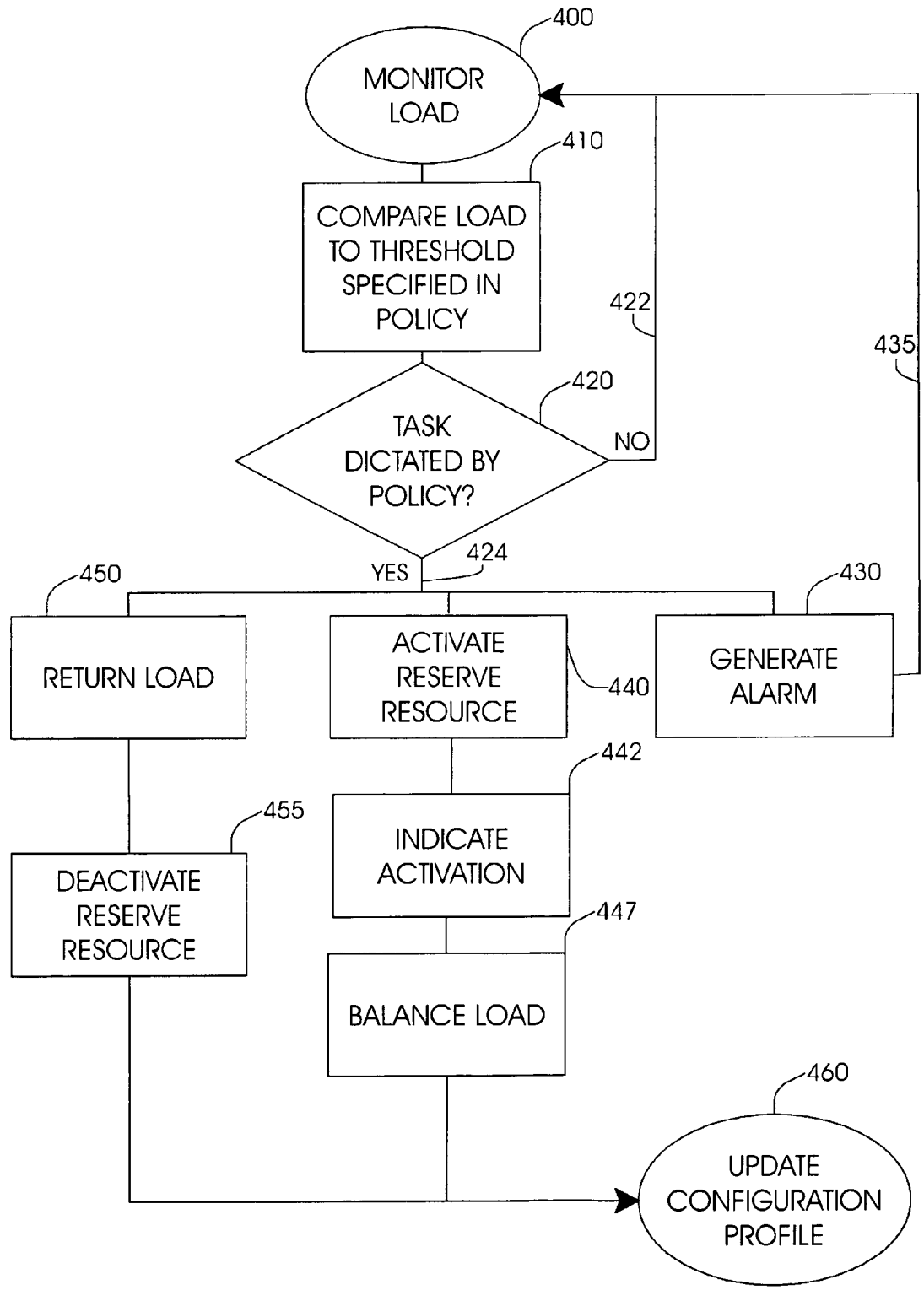
FIG. 4 is a flow chart showing steps to monitor a load on an active resource and perform a corresponding task when the load meets a threshold.

FIG. 4 shows a method to monitor the load on an active resource 60 and perform a corresponding task 320 when the load meets a threshold 315 specified in the resource usage policy 310. In step 400, the program code dictates monitoring a load on an active resource 60. For example, where the active resource 60 is a CPU or server, the load can be percent usage over time. Or for example, where the active resource 60 is a memory, the load can be space utilization with respect to space remaining. Any suitable algorithm for monitoring the load can be used under the teachings of the present invention and can be done using conventional component or system auditing software (e.g., the Microsoft WINDOWS® Resource Meter). The program code also dictates comparing the monitored load in step 410 to a threshold 315 specified in a resource usage policy 310. For example, a threshold 315 (e.g., 90%, 120 MB, 95%, etc.) can be specified as "≧90% CPU utilization for ten consecutive seconds," ">120 MB RAM utilization," "<95% port availability," or any other suitable specified threshold. If the monitored load does not meet the specified threshold 315 in step 420 (e.g., less than 90% CPU usage during the past ten seconds), the routine returns 422 to step 400 and the program code dictates continued monitoring of the load on the active resource 60. However, if the monitored load meets the specified threshold 315 in step 420 (e.g., ≧90% CPU utilization for the past ten seconds), the routine continues 424 and the resource usage policy 310 dictates performing the corresponding task 320. FIG. 4 shows three exemplary alternatives of corresponding tasks following 424 and discussed below in more detail.

As an example, the task 320 can be defined as "generate an alarm" when the monitored load on the active resource 60 is ">90% CPU utilization." Thus, when the monitored load meets the threshold 315 as specified by the resource usage policy 310, the program code dictates generating an alarm in step 430 that is transmitted to the event manager 50. For example, the processor 20 sends a page alerting the administrator of the status of the active resource 60. The routine returns 435 to step 400 and the program code dictates continued monitoring of the active resource 60.

As another example, the task 320 can be defined as "activate a reserve CPU" when the monitored load on the active resource 60 is "at least 90% CPU usage for five seconds." Thus, when the monitored load meets the specified threshold 315, the program code dictates activating the reserve resource 80 in step 440 using control software and/or hardware. In the preferred embodiment, each reserve resource 80 is electrically activated and recognized by the operating system (OS) upon boot. As such, the operating system can obtain status data regarding the reserve resource 80, the reserve resource 80 can be tested, the reserve resource 80 can be activated without rebooting the system, etc. However, the reserve resource 80 is not utilized prior to activation. To functionally activate a reserve resource 80, the OS is directed to recognize the resource as an available or activated reserve resource. Activation API (Application Programmers Interface) software is currently available to functionally activate hardware when a user inputs a predetermined passcode. That is, when the administrator recognizes that additional capacity must be added to the system, the administrator contacts the vendor and receives a passcode. The administrator then inputs the passcode to the activation API, which then "unlocks" the resource. Therefore, in one embodiment of the present invention for automatically activating reserve resources, upon detecting that a reserve resource 80 must be brought online (i.e., during monitoring in step 400), the program code can either "look-up" a passcode stored in memory 30 (e.g., in a look-up table or other data structure), or the program code can cause a connection to be established with the vendor (e.g., modem dial-up connection, DSL, etc.), and download or otherwise retrieve the passcode. The program code then submits the passcode to the activation API to activate the reserve resource 80. The appropriate threshold 315 can be specified to account for delays in obtaining and submitting this passcode. However, in another embodiment, a passcode is not necessary, and the activation API can be programmed to respond to other activation requests or signals made by the program code. It is understood that the activation API can be integrated into the OS, an overlay to the OS, etc. Alternatively, the reserve resource 80 can be electrically inactive at startup, and can be made electrically active prior to use. Program code or firmware to activate an electrically inactive resource is also within the understanding of one skilled in the art (e.g., a computer BIOS or OS power management functions).

Figure 5:
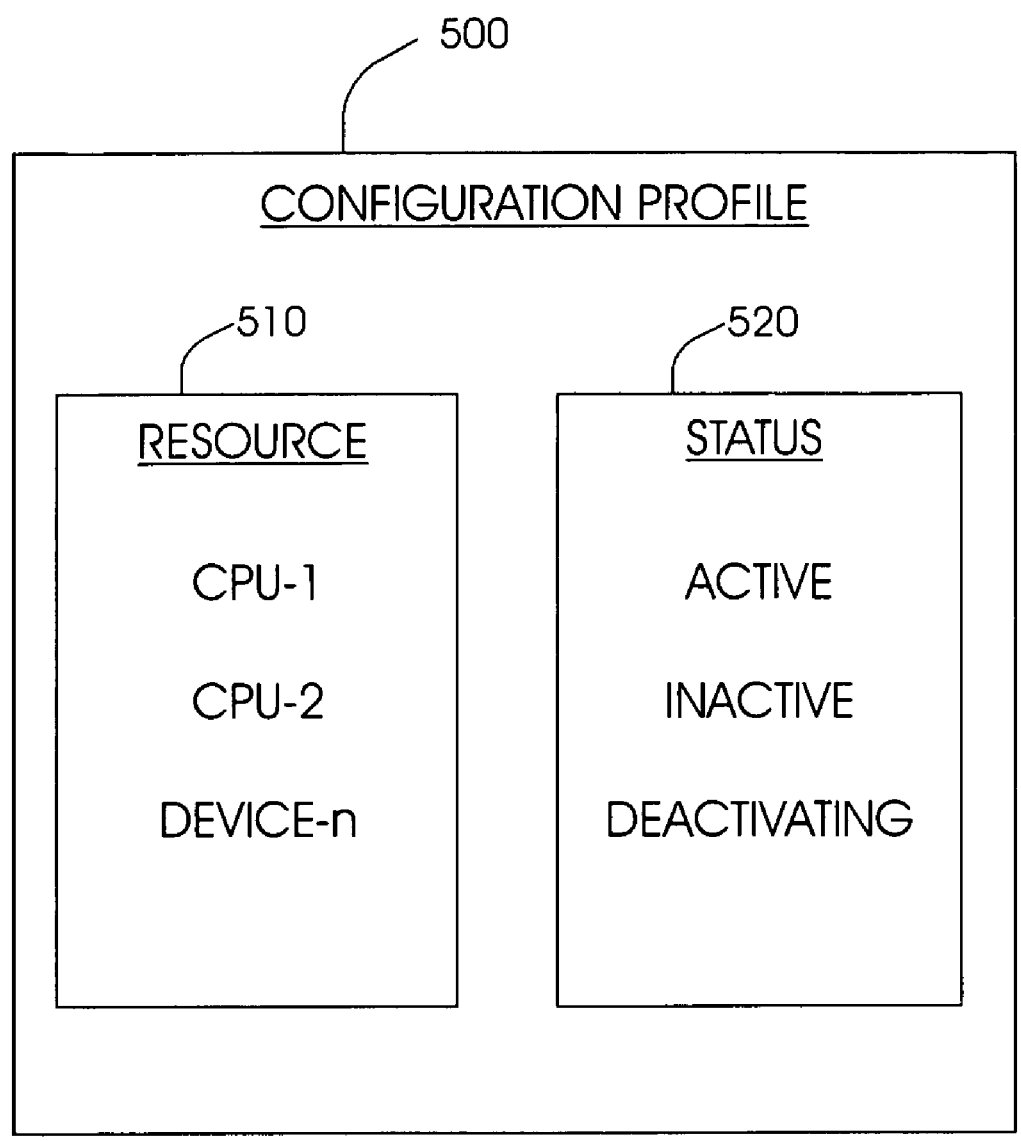
FIG. 5 is an exemplary configuration profile.

In step 442, the program code dictates indicating that the reserve resource 80 has been activated. The indication can be a message sent from the processor 20 to the administrator via an event manager 50, a signal sent to the peripheral device 40, a signal sent to a subroutine within the program code, a combination thereof, etc. In step 447, the program code dictates balancing the load among the active resource 60 and the activated reserve resource 80. For example, the load balancer 40 can route new tasks to the activated reserve resource 80. Alternatively, the load balancer 40 can transfer at least part of the load from the active resource 60 to the activated reserve resource 80 and then route new tasks to the resource 60 or 80 that is better able to handle the new task based on processing requirements, time requirements, etc. In step 460, the program code dictates updating a configuration profile 500 (FIG. 5). The configuration profile 500 can be a database stored in memory 30, such as that shown in FIG. 5, containing the status 510 (e.g., active, inactive, load, capacity, etc.) of each resource 60, 80 specified therein (e.g., at 520). The configuration profile 500 can be used to at least track the active resource 60 and the reserve resource 80 (both activated and inactive). As such, the load balancer 40 is able to route or balance the load among the available resources 60, 80, to activate additional reserve resources 80 when necessary, to generate alarms when there are no more reserve resources 80 available, etc.

As yet another example, the task 320 can be defined as "deactivating a reserve CPU" when the monitored load on the active resource 60 and/or the activated resource 80 is "less than 85% CPU usage for fifteen seconds" (i.e., the specified threshold 315). Thus, when the monitored load meets the specified threshold 315, the program code optionally dictates returning any remaining load on the activated reserve resource 80 to the active resource 60 in step 450 (FIG. 4) and deactivating the reserve resource 80 in step 455, again using control software and hardware as explained above with respect to activating the reserve resource. As such, the reserve resource 80 is returned to the reserve resource pool 90 and can be powered down to save cost, be made available to other systems, etc.

It is to be understood that the specified threshold 315 corresponding to the task 320 of deactivation can be the same specified threshold 315 as that corresponding to the task 320 of activation. However, preferably, the specified threshold 315 corresponding to the task 320 of deactivation is a separate specified threshold 315 to reduce bounce (i.e., switching a reserve resource 80 on and off) when the load on the active resource 60 fluctuates near the specified threshold 315. For example, the specified threshold 310 corresponding to the task 320 of deactivation is set so that the load must drop significantly before the reserve resource 80 is deactivated. Again, the program code dictates updating the configuration profile 500 in step 460 to indicate that the reserve resource 80 has been deactivated and returned to the reserve resource pool 90.

It is to be understood that any suitable task 320, threshold 315, or resource usage policy 310 can be dictated by the program code at 424 in the routine illustrated in FIG. 4. For example, the program code can dictate swapping a reserve resource 80 with an active resource 60 when the active resource 60 begins to fail (e.g., the threshold "processing error returned" is met) or when the active resource 60 should be upgraded (e.g., the threshold "processing speed below X MHz" is met). In addition, in a preferred embodiment, the program code dictates continued monitoring of the load after performing a task 320 so that any further changes in the load can be detected (i.e., the specified threshold 315 is met) and acted upon (i.e., the corresponding task 320 is performed).

Likewise, it is to be understood that computer readable program code can be conventionally programmed using any suitable computer readable programming language, and can include one or more functions, routines, subfunctions, and subroutines, and need not be combined in a single software package.

It is also to be understood that the terms "meet" and "met" as used herein (e.g., in step 420) are defined such that the monitored value or condition reaches or exceeds the threshold. However, the threshold 315 can be specified by the resource usage policy 310 to include a condition that the load must be "equal to", "greater than," "less than," "greater than or equal to," "averaged over time," "occurences per time period," etc.

It is to be further understood that the steps shown in FIG. 4 need not be performed in the order shown. For example, an alarm can be generated at step 430 followed by activating a reserve resource 440. Likewise, the present invention also contemplates methods including fewer steps and methods including additional steps than those shown in FIG. 4. For example, additional tasks 320 can be included at 424, or step 450 can be omitted when there is no load on the reserve resource 80 to be deactivated in step 455.

Another embodiment of the invention includes automatic monitoring and activation pricing. In one embodiment, a basic fee is charged for a system (e.g., a PC, a server, etc.). The basic fee includes the fee for the resources that are anticipated to be used on a regular basis (i.e., activated resources 60). The user is then charged a fee for use of reserve resources 80 using at least one of three different charge options. One option includes charging the basic fee in addition to a "one-time" use fee that is charged once a reserve resource 80 is activated. Under this option, once the reserve resource 80 is activated, the reserve resource 80 is purchased and no additional fees are charged for later use. A second option includes charging a basic fee in addition to an "as-needed" fee. Under this option, the "as-needed" fee is only charged for the period of use of the activated reserve resource 80. In this case, the basic fee for a reserve resource is essentially an option fee. Once the reserve resource 80 is deactivated and returned to the user pool 90, there are no additional charges. A third option includes charging a fee only upon activation of the reserve resource 80. Under this option, no basic fees are charged and the charges are only made on an "as-needed" basis as described above with respect to the second option. These charge options can be included in the monitoring policy and dictated by the program code (e.g., as tasks 320). For example, a policy might state "If load >90%, activate resource and alert billing agent that resource is being used." The above three illustrations are merely illustrative and other embodiments are also contemplated under the present invention, such as but not limited to charging a fee for administrator alerts, etc.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method to automatically activate a reserve hardware component, comprising:
   monitoring a load on a number of active resources;
   comparing said load to a threshold specified in a resource usage policy; and
   automatically activating said reserve hardware component when dictated by said resource usage policy, wherein the threshold specified in said resource usage policy is a rate of active resource consumption.

2. The method of claim 1, further comprising updating said resource usage policy after said reserve hardware component is activated.

3. The method of claim 1, further comprising balancing said load among said number of active resources and said activated reserve hardware component.

4. The method of claim 1, further comprising:
   a) monitoring a combined load on said number of active resources and said activated reserve hardware component;
   b) comparing said combined load to a second threshold specified in a second resource usage policy;
   c) deactivating a hardware component selected from said number of active resources and said activated reserve hardware component when dictated by said second resource usage policy; and
   d) indicating that said selected hardware component is deactivated.

5. The method of claim 1, further comprising signaling an event manager based on said monitored load as dictated by said resource usage policy.

6. The method of claim 1, wherein said resource usage policy dictates activating said reserve hardware component when said monitored load exceeds said threshold for a predetermined occurrence.

7. The method of claim 1, wherein said resource usage policy dictates activating said reserve hardware component when said monitored load exceeds said threshold for a period of time.

8. The method of claim 1, wherein said resource usage policy triggers a number of alarms when said threshold is met, and wherein said resource usage policy dictates activating said reserve hardware component when a response to said number of alarms is not received.

9. The method of claim 1, further comprising updating a configuration profile to include said activated reserve hardware component, said update being made in response to said indication that said reserve hardware component is activated.

10. The method of claim 1 further comprising charging a user of said activated reserve hardware component a fee, said charge being made in response to said indication that said reserve hardware component is activated.

11. The method of claim 1, wherein activating said reserve hardware component comprises activating a reserve processor.

12. The method of claim 11, wherein said reserve processor is a component of an active server resource.

13. The method of claim 1, wherein activating said reserve hardware component comprises activating a reserve memory.

14. The method of claim 13, wherein said reserve memory is a component of an active server resource.

15. An apparatus for automatically activating a reserve hardware component, comprising:
at least one computer readable storage media;
a resource usage policy stored on said at least one computer readable storage media; and
computer readable program code stored on said at least one computer readable storage media, said computer readable program code comprising:
program code for monitoring a load on a number of active resources;
program code for comparing said monitored load to a threshold specified in said resource usage policy;
program code for activating said reserve hardware component when dictated by said resource usage policy; and
program code for selecting a reserve hardware component to activate based on a hierarchical resource deployment scheme.

16. The apparatus of claim 15, further comprising program code for indicating that said reserve hardware component has been activated.

17. The apparatus of claim 15, further comprising program code for signaling an event manager based on said monitored load when dictated by said resource usage policy.

18. The apparatus of claim 15, further comprising program code for selecting said reserve hardware component from a pool of reserve resources.

19. The apparatus of claim 15, further comprising:
a) program code for monitoring a combined load on said number of active resources and said activated reserve hardware component;
b) program code for comparing said combined load to a second threshold specified in a second resource usage policy;
c) program code for deactivating a hardware component selected from said number of active resources and said activated reserve hardware component when dictated by said second resource usage policy; and
d) program code for indicating that said selected hardware component is deactivated.

20. The apparatus of claim 19, further comprising program code for returning said deactivated reserve hardware component to a pool of reserve resources.

21. The apparatus of claim 15, further comprising:
a configuration profile stored on said at least one computer readable storage medium; and
program code for updating said configuration profile to track the availability of each said resource.

22. The apparatus of claim 15, wherein said program code for activating said reserve hardware component activates a reserve processor.

23. The apparatus of claim 22, wherein said reserve processor is a component of an active server resource.

24. The apparatus of claim 15, wherein said program code for activating said reserve hardware component activates a reserve memory.

25. The apparatus of claim 24, wherein said reserve memory is a component of an active server resource.

26. The apparatus of claim 15, wherein the threshold specified in said resource usage policy is a rate of active resource consumption.

* * * * *